Oct. 27, 1936.  D. M. SMITH  2,059,179
PISTON RING
Filed Feb. 16, 1934
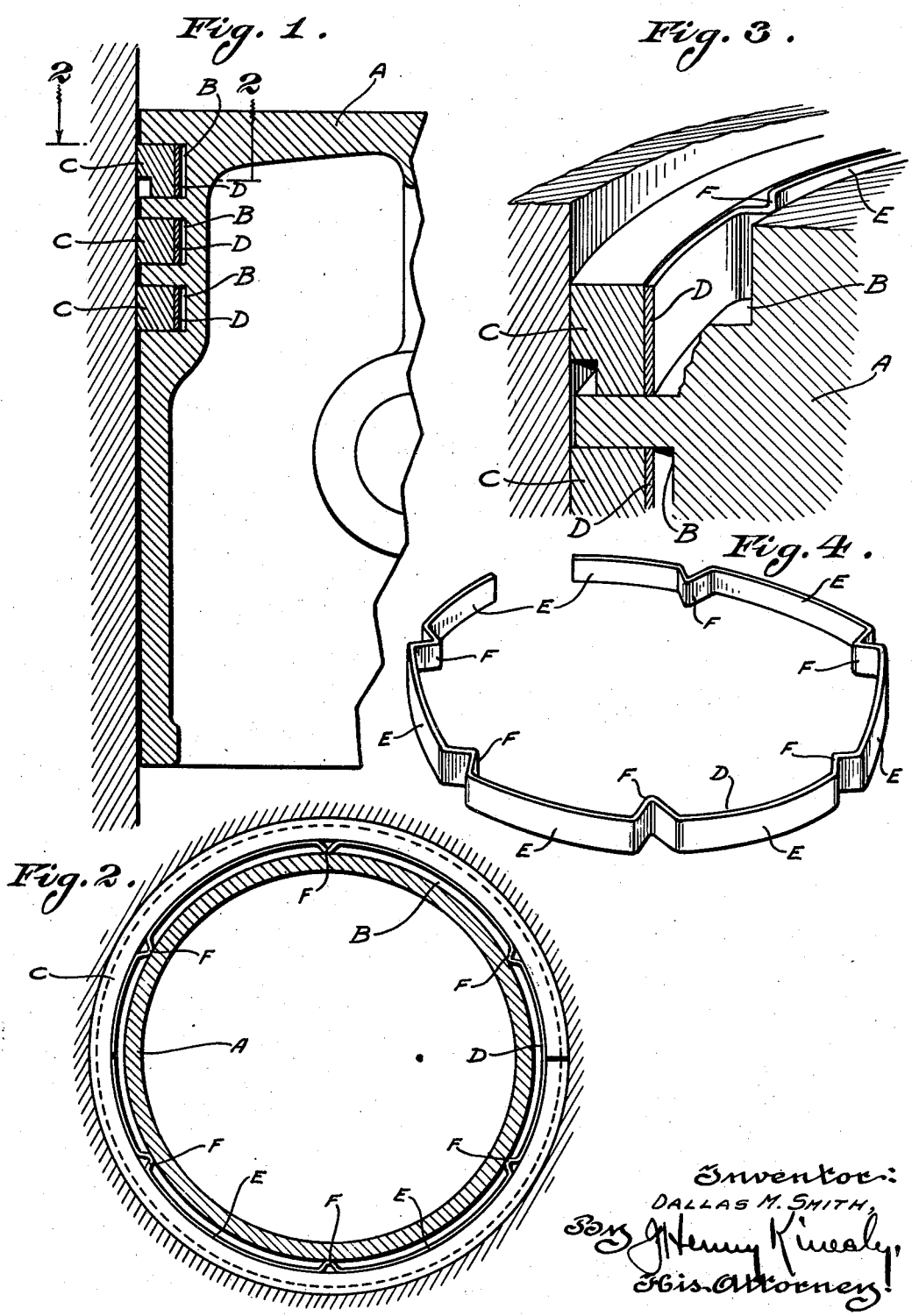
Inventor:
DALLAS M. SMITH, Patented Oct. 27, 1936

2,059,179

UNITED STATES PATENT OFFICE 2,059,179

PISTON RING

Dallas M. Smith, St. Louis County, Mo., assignor to McQuay-Norris Manufacturing Company, St. Louis, Mo., a corporation of Delaware Application February 16, 1934, Serial No. 711,456

3 Claims. (Cl. 309—43)

My invention relates to piston rings and more particularly to piston ring structures as are used in combination with the pistons of internal combustion engines.

Where it is desirable to increase the outward radial pressure of a piston ring against the cylinder wall a spring expander is usually placed behind the piston ring so as to be positioned between the inner face of the ring and the bottom wall of the ring groove formed in the piston.

As heretofore made such expanders, to get best results, have comprised portions contacting the inner face of the ring and other portions contacting the piston, at the bottom of the ring groove. With corrugated expanders including a series of undulations of equal length the area of the expander in contact with the ring is substantially equal to the area in contact with the piston. With expanders of polygonal shape arranged as heretofore taught with the long sides bearing against the piston the area of the expander in contact with the piston is much greater than the area in contact with the ring.

I have found that most efficient operation of a packing ring structure is obtained when the piston ring is active in the groove in the piston. That is, when free movement circumferentially and axially is allowed between the ring and the piston so that the ring does not become worn at certain points to an extent where efficient operation is impaired, and so that the ring may shift axially during successive strokes of the piston to engage both side walls of the ring groove.

With the use of expanders as heretofore made the ring and its coordinating expander could not move freely in the ring groove because the area in frictional contact between the expander and the ring and the piston was either substantially equal or, which was worse, was greater between the expander and the piston than between the expander and the ring. While, of course, the forces developed between the expander and the ring and the piston are balanced, I have found that this area of frictional contact has a great effect in preventing movement of the ring structure in the ring groove.

The objects of my invention are to provide a piston ring structure for use in combination with a piston and which structure includes a sinuous expander adapted and arranged whereby there will be only a comparatively small frictional area in contact with the piston whereby free movement of the ring structure on the piston will be allowed.

In the accompanying drawing, I have shown one embodiment of my invention and in this drawing, wherein similar characters are used to designate parts, Fig. 1 is a fragmentary view of a piston and cylinder showing a packing structure as used therewith; Fig. 2 is a section along the lines 2—2 in Fig. 1; Fig. 3 shows details of construction; and Fig. 4 is a view of the expander before being combined with the other parts.

Referring to the figures the piston A has provided therein a plurality of ring grooves B within each of which is mounted a piston ring C. Herein, I have shown three ring grooves with conventional snap rings mounted in the lower two grooves and with an oil scraping ring having the lower outer corner thereof cut away, as shown, mounted in the upper groove. Behind each of the rings C is positioned an expander D made according to my invention.

Each of the expanders D is sinuous and, preferably, is generally polygonal in shape with comparatively long resilient side portions E connected by short inwardly extending spring sections F, as shown in Fig. 4. I prefer that the spring sections F be formed by making a U or V bend in the expander between adjacent side portions E so that contact with the piston, as explained below, will be minimized. The expander, preferably, has the gap therein positioned in a side portion E.

When the expander is placed in a ring groove B behind a piston ring C the comparatively long side portions E will bear against the inner face of the ring and the apex of each spring section F will contact the piston, as clearly shown in Fig. 2. When so arranged the area of frictional contact between the expander and the piston ring will be much greater than the area of frictional contact between the expander and the piston and, although the forces exerted by the various parts will be balanced, the difference in contacting area will allow free movement of the ring structure in the ring groove.

I do not intend to limit myself to the exact details of construction shown in the drawing because the shape of the expander and its position relative to the other parts of the assembly may be varied within wide limits without deviating from the spirit of my invention as included in the appended claims.

What I claim as new and desire to secure by Letters Patent, is:—

1. A piston ring expander having a plurality of long resilient side portions arranged and adapted to bear against the inner face of a piston ring throughout their length and relatively short inwardly extending spring sections connecting adjacent of said side portions and adapted to contact the bottom wall of the ring groove of a piston.

2. A piston ring expander of substantially polygonal shape and having the side portions thereof arranged and adapted to bear against the inner face of a piston ring throughout their length and inwardly bent relatively short sections connecting adjacent of said side portions and adapted to contact the bottom wall of the ring groove of a piston.

3. A piston ring expander of substantially polygonal shape and having long side portions thereof arranged and adapted to bear against the inner face of a piston ring throughout their length and having relatively short inwardly bent spring sections connecting adjacent of said side portions and adapted and arranged whereby the apexes of said spring sections comprise the entire contacting surface between said expander and a piston.

DALLAS M. SMITH.